TECHNIQUE FOR ANODIZATION OF THIN FILM RESISTORS

Filed Aug. 7, 1967

INVENTOR
J. T. KOO
BY [signature]
ATTORNEY

United States Patent Office 3,481,843
Patented Dec. 2, 1969

3,481,843

TECHNIQUE FOR ANODIZATION OF THIN FILM RESISTORS

James T. Koo, Fullerton, Pa., assignor to Bell Telephone Laboratories, Incorporated, Murray Hill and Berkeley Heights, N.J., a corporation of New York Filed Aug. 7, 1967, Ser. No. 658,857
Int. Cl. C23b 9/00; C23f 17/00
U.S. Cl. 204—38 9 Claims

ABSTRACT OF THE DISCLOSURE

Anodization to value of thin film resistors may be effected utilizing an internal cathode deposited in thin film form as a part of the conductor pattern. Independent anodization of interconnected resistors of integrated circuits may be effected utilizing at least two cathodes, either internal or external in a common electrolytic bath.

Figure 1:
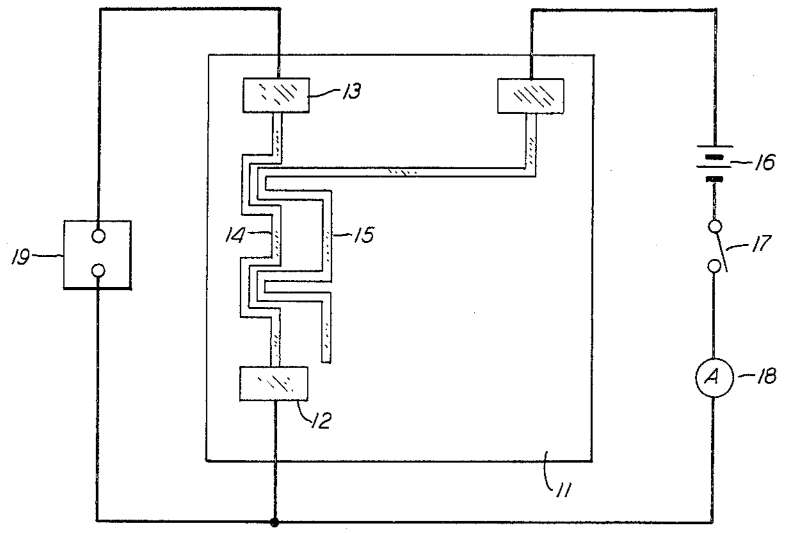

This invention relates to a method for the fabrication of precision metal film resistors. More particularly, the present invention relates to a technique for the anodization of thin film resistors.

In recent years, a widely used method for reducing the size of electrical apparatus has been the substitution of printed circuits for conventional wiring. Accordingly, a need has been created for precise and accurate procedures for fabricating printed circuit components, particularly resistors.

The earliest printed circuit resistors consisted of an array of parallel lines which were connected at alternate ends to form a continuous path, the configuration also including "shorting bars" which served to connect alternate lines, thereby shorting out the resistance of the line intermediate the two connected lines. Resistors of this type were designed to have a resistance lower than the desired value and adjustment was made by cutting through an appropriate number of shorting bars.

The next step in the development of printed circuit resistors is described in U.S. Patent 3,148,129 issued on Sept. 8, 1964. The patented technique involved depositing a film-forming metal upon a substrate in a configuration such that the resistance of the deposited layer is less than that ultimately desired and, subsequently, anodizing the deposited layer to convert a portion of the metal layer thickness to the oxide form, thereby increasing the resistance of the layer, anodization being continued until the resistance of the metal layer attained a desired value, as indicated by a monitoring means.

Although devices fabricated in accordance with this procedure proved satisfactory in most applications, resistance drift was noted. In order to obviate this malady, a technique described in U.S. Patent 3,159,556, issued on Dec. 1, 1964, was developed. The procedure described therein involved the appending of a thermal oxidation step to the anodization technique alluded to above.

The techniques described for accomplishing this end, that is, the fabrication of precision metal film resistors have usually involved electrolytic anodization. To this end, it has been common to place electroplater's tape on the substrate of interest and to construct a suitable dam thereon to confine the electrolyte and to prevent it from contacting the terminals. In the operation of the anodization process a cathode is immersed in the electrolyte, thereby providing the requisite electrical contact. Unfortunately, workers in the art have encountered numerous difficulties in physically situating a metal electrode in the electrolyte without damaging the circuitry below, so prompting a search for a suitable alternative.

In accordance with the present invention, a technique is described for the fabrication of precision metal film resistors wherein the prior art limitation alluded to hereinabove is effectively obviated by the use of an internal cathode during anodization. The inventive technique involves depositing a film-forming metal upon a substrate in a configuration such that the resistance of the deposited layer is less than that ultimately desired and simultaneously depositing upon the substrate member an electrode or internal cathode which is an integral part of the conductor pattern. Thereafter an electrolyte is contacted with the deposited pattern and the anodization thereof effected by biasing the internal cathode negative with respect to the resistive film, anodization being continued until the resistance of the deposited film attains a desired value as indicated by a monitoring means.

In an alternative embodiment of the present invention independent anodization of interconnected resistors of integrated circuits in a common electrolytic bath is effected utilizing a pair of cathode members either internal or external in the presence of or in the absence of an isolation electrode, thereby completely avoiding burdensome masking requirements.

Figure 2:
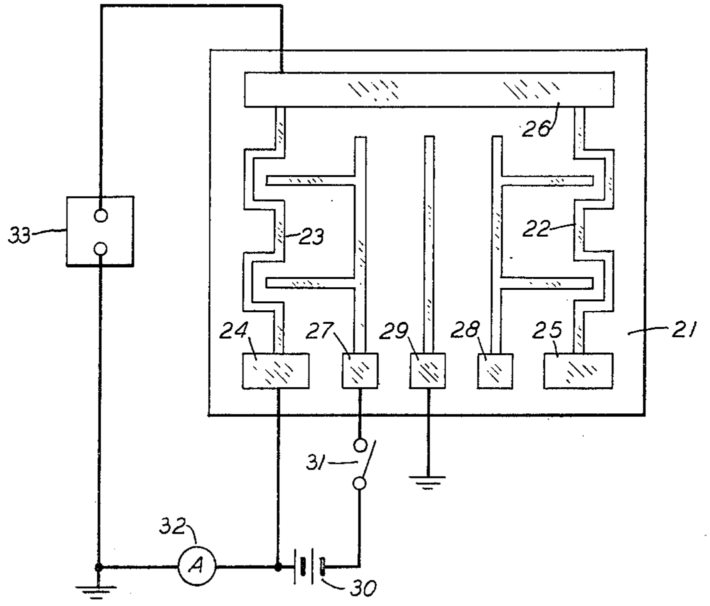

The invention will be more readily understood from the following detailed description taken in conjunction with the accompanying drawing wherein:

FIG. 1 is a plan view of a substrate with a resistor pattern of a film-forming metal and an internal cathode deposited thereon and a schematic representation of the circuitry utilized in the anodization procedure in accordance with the inventive method, and FIG. 2 is a plan view of a substrate with a pair of interconnected thin film resistors, a pair of exemplary cathode members and an isolation electrode deposited thereon and a schematic representation of the circuitry employed in the independent anodization of the resistors.

With further reference now to FIG. 1, there is shown a plan view of a substrate 11 comprised of one of the refractory insulating materials conventionally employed in the construction of printed circuit boards, having deposited thereon two terminals, 12 and 13, of an electrically conductive metal such as gold, silver or copper, and a suitable resistor pattern 14 of a film-forming metal such as tantalum, aluminum, titanium, niobium, hafnium, nichrome or compounds thereof. Also shown deposited upon substrate 11 is a layer of an electrically conductive internal cathode 15. The configuration and thickness of resistor 14 are chosen so that the resistance of the layer measured between terminals 12 and 13 is less than the desired value. In accordance with the inventive method, the resistance of 14 is increased by electrolytic anodization. The electrical circuit connecting internal cathode member 15 and terminal 12 includes a variable direct current power supply 16, switch 17 and ammeter 18. A resistance monitoring means 19 such as a Leeds and Northrup Type S Test Set is connected to terminals 12 and 13 and provides a continuous indication of the restance of resistor 14.

In the operation of the anodization process, a suitable electrolyte is contacted with the resistor 14. This end may be attained by any conventional means, as for example, by placing electroplater's tape on substrate 11 at the edges thereof and constructing a dam of a suitable plastic material so as to confine the electrolyte and prevent it from contacting terminals 12 and 13, by dampening suitable sheets or pads of felt with the electrolyte and placing them in contact with resistor 14, and so forth. The electrolyte employed in the practice of the invention may be any one of the conventional anodizing electrolytes commonly employed in the industry as, for example, a solution of boric acid, citric acid, acetic acid, oxalic acid and so forth.

Anodization of resistor 14 is initiated by closing switch 17 and applying a direct current voltage between cathode 15 and resistor 14. The surface of resistor 14 in contact with the electrolyte is converted to the oxide form, the extent of such conversion being directly dependent upon the voltage applied. The anodizing voltage is gradually increased, maintaining the current density at a low value until resistance monitoring means 19 indicates that the desired value of resistance has been attained. Switch 17 is then opened, terminating the anodization process.

The film-forming metal utilized in the practice of the present invention may be initially deposited by conventional sputtering or vacuum evaporation techniques. As indicated above, the configuration and thickness of the film are determined by the ultimate value of resistance desired. The initial thickness of the deposited metal film is preferably above 350 Angstroms. This value is based upon two factors; first, the metal thickness subsequent to anodization is preferably greater than 100 Angstroms to assure continuity, and second, conversion of at least 250 Angstroms to oxide is preferable from the standpoint of ease of operation.

There is no upper limit of initial film thickness dictated by considerations of the inventive process, any film thickness which conforms to the desired ultimate resistance value being suitable. However, consideration of the difference in temperature coefficient of expansion between the substrate and the film dictate a maximum of approximately 25,000 Angstroms.

The anodizing procedure employed in the inventive technique is governed by all of the factors generally encountered in conventional anodizing procedures. Anodization is initiated at a relatively low voltage in accordance with conventional procedures. The voltage is increased while maintaining the current density within the range of 0.2 to 5.0 milliamperes per square centimeter. The upper limit of this preferred range is based upon the fact that higher values result in substantial heating effects which are undesirable. At current densities below 0.2 milliamperes per square centimeter, the anodizing process proceeds at a rate which is too slow from a practical standpoint. The upper limit of anodizing voltage is approximately 400 volts since higher voltages may introduce unwanted side effects such as scintillation and corrosion.

In an alternative embodiment of the present invention independent anodization of interconnected resistors of integrated circuits in a common electrolytic bath is effected utilizing a pair of cathode members, either internal or external, and optionally an isolation electrode.

With reference now more particularly to FIG. 2, there is shown a plan view of a substrate 21 having deposited thereon a pair of interconnected resistor patterns 22 and 23, terminals 24 and 25, respectively, a common terminal 26, a pair of internal cathode members 27 and 28 and an isolation electrode 29. The electrical circuit employed in the independent anodization of resistor 23 includes a variable direct current power supply 30, switch 31 and ammeter 32. A resistance monitoring means 33 is connected to terminals 24 and 26 and provides a continuous indication of the resistance value of resistor 23.

In the operation of this embodiment of the inventive technique a thin layer of a suitable electrolyte is placed upon the entire circuit except for the terminal areas. Anodization of resistor 23 is initiated by closing switch 31 and applying a negative potential to cathode 27 with respect to resistor 23. A ground potential (as shown) or, optionally, a slightly positive potential is applied to isolation electrode 29 so that the electrolyte in contact with resistor 22 is maintained at ground or a slightly negative potential, thus assuring that resistor 22 will not anodize.

It will be appreciated that isolation of the resistors need not be complete and as long as the magnitude of the potential of the electrode in the region of resistor 22 is smaller than the final designed anodizing voltage thereof, independent anodization of resistors 22 and 23 may be effected. It will also be recognized that an independent isolation electrode is unnecessary, cathode 28 being sufficient to function as an isolation electrode while resistor 23 is being anodized. The internal and external cathodes as well as the isolation electrode employed in the practice of the present invention may comprise any electrically conductive material capable of being deposited in thin films upon the substrates of interest. For convenience, it has been found advantageous to employ aluminum or tantalum for this purpose.

Examples of the present invention are described in detail below. The examples are intended to be illustrative of the present invention and it is to be appreciated that the procedures described may be varied by one skilled in the art without departing from the spirit and scope of the invention.

EXAMPLE 1

A sputtering apparatus including a cathode comprising a circular tantalum disk 40 mils thick and four inches in diameter of high purity was used to reactively sputter a tantalum nitride resistor pattern similar to that shown in FIG. 1. In the apparatus actually employed, the anode was grounded, the potential difference being obtained by making the cathode negative with respect to ground.

An unglazed ceramic approximately one and one-half inches in width and three inches in length was employed as a substrate. Nichrome-copper palladium terminals, ⅜ inches by ¼ inches were evaporated on the substrate as shown in FIG. 1. The terminated slides were next cleansed by conventional ultrasonic cleaning techniques. The vacuum chamber was evaporated by means of a roughing pump and an oil diffusion pump to a pressure of approximately $2\times10^{-6}$ millimeters of mercury after a time period of approximately 45 minutes. The substrate was then heated to a temperature of approximately 400 degrees centigrade and nitrogen admitted into the chamber at a pressure of approximately 15 microns of mercury. During the sputtering reaction, the partial pressure of the nitrogen was maintained at approximately $10\times10^{-5}$ millimeters of mercury. The anode and cathode were spaced approximately 2.5 inches apart,, the cleansed substrate being placed therebetween at a point immediately without Crooke's Dark Space. A direct current voltage of 5000 volts was then impressed between the cathode and anode. Sputtering was conducted for ten minutes through a mechanical mask, so resulted in a tantalum nitride pattern substantially as shown in FIG. 1 having a thickness of 1000 Angstroms. The initial resistance of resistor 14 was approximately 11.85 kilohms.

A felt pad sufficient to cover the pattern was next dampened with an electrolyte comprising a 0.1 percent by weight solution of citric acid and contacted therewith. A variable direct current power supply, ammeter and a Leeds and Northrup Type S Test Set were then connected substantially as shown in FIG. 1. Anodization was effected by applying a difference of potential between the internal cathode and the resistive element 14, the anodizing voltage being increased while maintaining the current density within the range of 0.4 to 1.2 milliamperes per square centimeter. Anodization was continued until the monitor indicated that the ultimate resistance value had been obtained. The actual resistive value after anodization was 13,000 kilohms.

EXAMPLE 2

A pattern of tantalum nitride substantially as shown in FIG. 2 was produced in the manner described in the preceding example. Anodization was effected by applying a difference of potential between cathode 27 and resistor 23, isolation electrode 29 being grounded. Anodization was continued until the monitor indicated that the ultimate resistive value had been attained. The initial value of resistors 22 and 23 was 15,000 kilohms and 15,500 kilohms respectively. The actual resistance value after anodization of resistors 22 and 23 was 17,000 kilohms and 17,500 kilohms respectively.

While the invention has been described in detail in the foregoing description and the drawings similarly illustrate the same, the aforesaid is by way of illustration only and is not restrictive in character. The several modifications which will readily suggest themselves to persons skilled in the art are all considered within the broad scope of the present invention, reference being had to the appended claims.

What is claimed is:

1. A method for the fabrication of a metal film resistor having a predetermined resistance value which comprises the steps of depositing a layer of a film-forming metal upon a substrate in a configuration such that the resistance of said layer is less than that desired, contacting said layer with an anodizing electrolyte, passing an anodizing current between said layer and an electrode in contact with said electrolyte and continuing said anodization until the resistance of said layer attains a desired value as indicated by a monitoring means characterized in that said electrode is deposited upon said substrate as a film.

2. A method in accordance with the procedure of claim 1 wherein said electrode and said layer of film-forming metal are comprised of tantalum.

3. A method for the independent anodization of interconnected thin film resistive elements which comprises the steps of depositing at least two resistive elements of a film-forming metal upon a substrate in a configuration such that the resistance of each of said elements is less than that desired, contacting said elements with an anodizing electrolyte in the presence of at least two electrodes situated adjacent to each of said resistive elements and to each other, passing an anodizing current between one of said elements and the electrode adjacent thereto, the other electrode being maintained at ground potential with respect to said element undergoing anodization and continuing said anodization until the resistance of said element undergoing anodization attains a desired resistive value as indicated by a monitoring means.

4. A method in accordance with the procedure of claim 3 wherein said electrodes are internal electrodes.

5. A method in accordance with the procedure of claim 3 wherein said electrodes are internal electrodes deposited in thin film form upon said substrate member.

6. A method in accordance with claim 3 wherein an isolation electrode is deposited intermediate said electrodes.

7. A method in accordance with the procedure of claim 3 wherein said resistive elements and said electrodes are comprised of tantalum.

8. A method in accordance with the procedure of claim 6 wherein the isolation electrode is maintained at ground potential with respect to the resistive element undergoing anodization.

9. A method in accordance with the procedure of claim 6 wherein said isolation electrode is maintained at a positive potential with respect to the resistor undergoing anodization.

References Cited

UNITED STATES PATENTS

| | | | |
|---|---|---|---|
| 3,398,067 | 8/1968 | Raffalovich | 204—37 |
| 3,159,556 | 12/1964 | McLean et al. | 204—37 |

JOHN H. MACK, Primary Examiner

R. L. ANDREWS, Assistant Examiner

U.S. Cl. X.R.

204—228